United States Patent
Yamada (10) Patent No.: US 9,420,124 B2
(45) Date of Patent: Aug. 16, 2016

(54) IMAGE PROCESSING DEVICE AND IMAGE PROCESSING SYSTEM

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/608,755

(22) Filed: Sep. 10, 2012

(65) Prior Publication Data

US 2013/0107318 A1  May 2, 2013

(30) Foreign Application Priority Data

Oct. 31, 2011 (JP) ................................. 2011-238422

(51) Int. Cl.
*G06K 15/02* (2006.01)
*H04N 1/00* (2006.01)
(Continued)

(52) U.S. Cl.
CPC .......... *H04N 1/00233* (2013.01); *G06F 3/1207* (2013.01); *G06F 3/1236* (2013.01); *G06F 3/1288* (2013.01); *G06K 15/002* (2013.01); *G06K 15/4045* (2013.01); *H04N 1/0048* (2013.01); *H04N 1/00217* (2013.01); *H04N 1/00244* (2013.01); *H04N 1/00915* (2013.01); *H04N 1/4433* (2013.01); *H04N 1/00488* (2013.01); *H04N 1/32765* (2013.01); *H04N 1/32786* (2013.01); *H04N 2201/0027* (2013.01); *H04N 2201/0039* (2013.01); *H04N 2201/0041* (2013.01); *H04N 2201/0044* (2013.01); *H04N 2201/0049* (2013.01); *H04N 2201/0055* (2013.01); *H04N 2201/0082* (2013.01)

(58) Field of Classification Search
None
See application file for complete search history.

(56) References Cited

U.S. PATENT DOCUMENTS 5,774,637 A * 6/1998 Haber et al. ................. 358/1.15
5,889,930 A   3/1999 Fukudome
(Continued)

FOREIGN PATENT DOCUMENTS

CN  102209022 A   10/2011
EP       1310863 A2 *  5/2003 ............... G06F 3/12
(Continued)

OTHER PUBLICATIONS

European Patent Office, extended European Search Report for European Patent Application No. 12183973.2 (counterpart European patent application), dated Feb. 4, 2013.
(Continued)

*Primary Examiner* — Mohammad Ghayour
*Assistant Examiner* — Pawandeep Dhingra
(74) *Attorney, Agent, or Firm* — Baker Botts L.L.P.

(57) ABSTRACT

An image processing device is provided that includes an establishment unit configured to establish a first connection with a first information processing device, a detector configured to detect a connection request that requests the image processing device to terminate the first connection with the first information processing device and thereafter establish a second connection with a second information processing device, the second connection being an exclusive connection configured to forbid establishment of connections other than the second connection while being established, and a restriction unit configured to restrict the second connection with the second information processing device from being established when the detector detects the connection request in a state where the first connection is established between the image processing device and the first information processing device.

15 Claims, 7 Drawing Sheets

(51) Int. Cl.
*H04N 1/44* (2006.01)
*G06F 3/12* (2006.01)
*G06K 15/00* (2006.01)
*H04N 1/327* (2006.01)

(56) References Cited

U.S. PATENT DOCUMENTS

| | | | |
|---|---|---|---|
| 6,369,906 B1 * | 4/2002 | Nakao | 358/1.15 |
| 2010/0259783 A1 * | 10/2010 | Matsuzawa | 358/1.15 |
| 2011/0063665 A1 | 3/2011 | Hirakawa et al. | |
| 2011/0122434 A1 * | 5/2011 | Kim | 358/1.15 |
| 2011/0194147 A1 * | 8/2011 | Kato | 358/1.15 |
| 2013/0024571 A1 * | 1/2013 | Wu et al. | 709/225 |

FOREIGN PATENT DOCUMENTS

| | | | |
|---|---|---|---|
| EP | 2555468 A1 | 2/2013 | |
| JP | H071769 A | 1/1995 | |
| JP | 2003-330686 A | 11/2003 | |
| JP | 2003320732 A | 11/2003 | |
| JP | 2008159021 A | 7/2008 | |
| JP | 2011086280 A | 4/2011 | |
| JP | 2011116047 A | 6/2011 | |
| WO | WO 2011120436 A1 * | 10/2011 | G06F 3/12 |

OTHER PUBLICATIONS

European Patent Office, Office Action for European Patent Application No. 12183973.2 (counterpart European patent application), mailed Apr. 25, 2014.

Japan Patent Office, Notice of Reasons for Rejection issued for Japanese Patent Application No. JP 2011-238422, mailed Mar. 10, 2015.

* cited by examiner

IMAGE PROCESSING DEVICE AND IMAGE PROCESSING SYSTEM

CROSS-REFERENCE TO RELATED APPLICATION

This application claims priority under 35 U.S.C. §119 from Japanese Patent Application No. 2011-238422 filed on Oct. 31, 2011. The entire subject matter of the application is incorporated herein by reference.

BACKGROUND

1. Technical Field

The following description relates to one or more techniques for an image processing system configured to allow an image processing device to accept a connection request that requests the image processing device to terminate a first connection with a first information processing device and establish a second connection with a second information processing device such that the second information processing device exclusively utilizes the image processing device via the second connection, in a state where the image processing device is maintaining the first connection with the first information processing device.

2. Related Art

A printing system has been known that is configured to allow an information processing device to transmit print data to an image processing device via a server on the condition that the image processing device establishes a connection with the server and maintains an access-permitted state where the image processing device permits the server to access the image processing device. Additionally, for instance, a communication technique has been known that is adapted to establish a one-on-one direct connection between an image processing device and an information processing device and allow the information processing device to transmit print data to the image processing device without involving any server.

For example, a printing system has been known in which one or more client PCs are connected with one or more image processing devices via one or more networks, and a print job is transmitted by an information processing device to an image processing device via a print limiting server. Various devices included in the printing system are interconnected via networks such as LANs.

SUMMARY

However, the aforementioned known image processing device has the following problem. For example, it is assumed that there is an image processing device that establishes a connection with a server via a LAN and/or the Internet and maintains the access-permitted state where the image processing device permits the server to access the image processing device, and the image processing device accepts a connection request that requests the image processing device to terminate the connection with the server and establish another connection with an information processing device different from the server. In this situation, when the image processing device switches the connection destination in response to the connection request, it causes a problem that a user of the server becomes unable to utilize the image processing device despite the user's intention.

Aspects of the present invention are advantageous to provide one or more improved techniques that make it possible to avoid an undesired situation where when an image processing device establishes a connection with an information processing device, a user of another information processing device becomes unable to utilize the image processing device despite the user's intention.

According to aspects of the present invention, an image processing device is provided that includes an establishment unit configured to establish a first connection with a first information processing device, a detector configured to detect a connection request that requests the image processing device to terminate the first connection with the first information processing device and thereafter establish a second connection with a second information processing device, the second connection being an exclusive connection configured to forbid establishment of connections other than the second connection while being established, and a restriction unit configured to restrict the second connection with the second information processing device from being established when the detector detects the connection request in a state where the first connection is established between the image processing device and the first information processing device.

According to aspects of the present invention, further provided is an image processing system that includes an image processing device, a first information processing device configured to communicate with the image processing device, and a second information processing device configured to communicate with the image processing device, the image processing device including an establishment unit configured to establish a first connection with the first information processing device, a detector configured to detect a connection request that requests the image processing device to terminate the first connection with the first information processing device and thereafter establish a second connection with the second information processing device, the second connection being an exclusive connection configured to forbid establishment of connections other than the second connection while being established, and a restriction unit configured to restrict the second connection with the second information processing device from being established when the detector detects the connection request in a state where the first connection is established between the image processing device and the first information processing device.

According to aspects of the present invention, further provided is an image processing device that includes an image processing unit configured to perform image processing for an image, a communication unit configured to select, as a communication destination, one of a first information processing device and a second information processing device, an instruction receiving unit configured to receive an instruction that designates the communication destination of the communication unit, and a controller configured to, in response to the instruction receiving unit receiving an instruction that designates the second information processing device as the communication destination of the communication unit, control the communication unit to maintain the first information processing device as the communication destination when the first information processing device is selected as the communication destination, and control the communication unit to change the communication destination to the second information processing device when the first information processing device is not selected as the communication destination.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described in detail with reference to the accompanying drawings. In the embodiments, aspects of the present invention are applied to a cloud printing system that includes a cloud server configured to store print data and a printer configured to be connected with the cloud server. It is noted that the cloud server is a virtual server beyond a cloud in a concept of cloud computing. Further, the cloud server is configured to be operated on a WEB browser by letting packets pass through the cloud.

Figure 1:
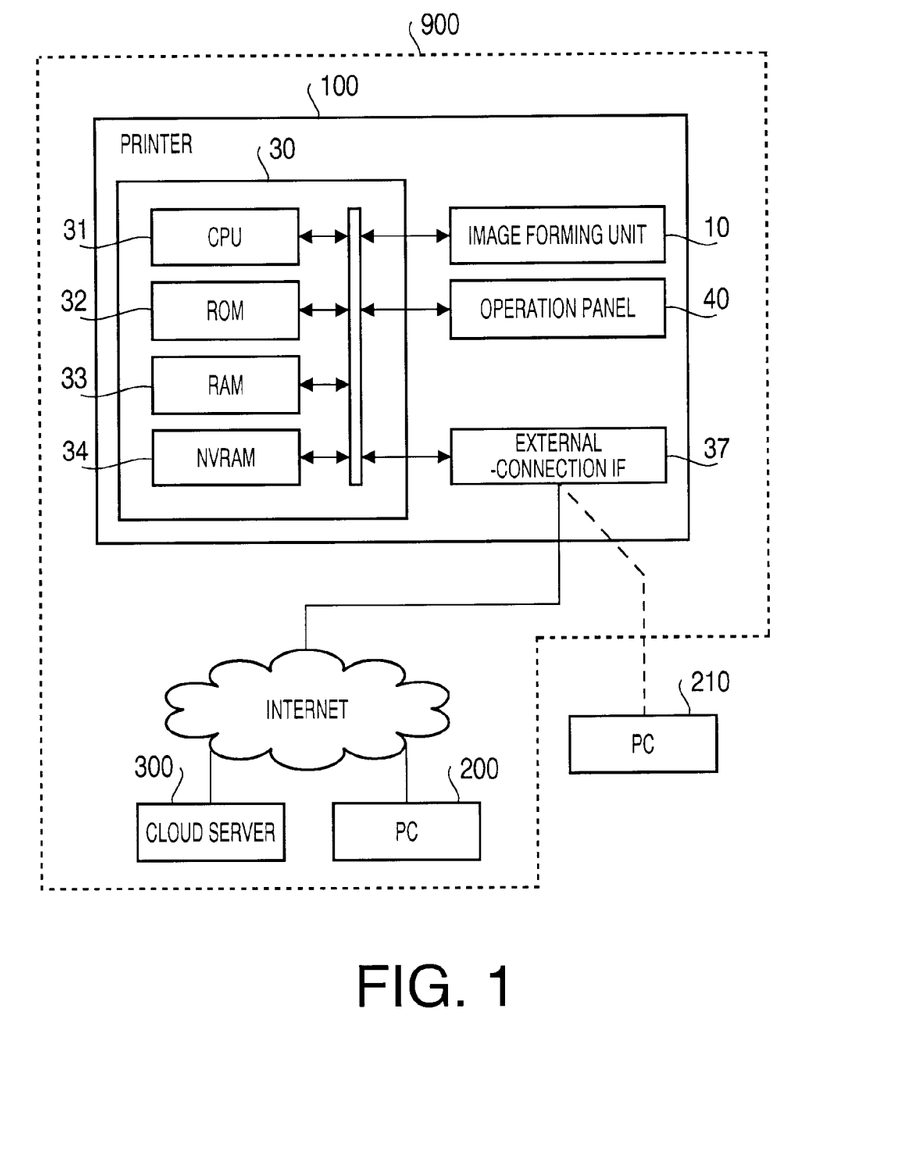
FIG. 1 is a block diagram schematically showing a configuration of a cloud printing system and an electrical configuration of a printer in accordance with one or more aspects of the present invention.

[Configuration of Cloud Printing System]
As shown in FIG. 1, a cloud printing system 900 according to aspects of the present invention includes a printer 100, a PC 200, and a cloud server 300. The cloud server 300 is configured to store a print job output from the PC 200 and transmit the stored print job to the printer 100.

In the cloud printing system 900, the PC 200 is required to establish a communication connection with the cloud server 300 in order to transmit a print job to the cloud server 300. Further, the printer 100 is required to establish a communication connection with the cloud server 300 in order to acquire print data from the cloud server 300. It is noted that a state where the communication connection is established contains not only a physically connected state but also a state where the cloud server 300 permits communication with the PC 200 or the printer 100.

An operation for the PC 200 to establish a communication connection with the cloud server 300 will be referred to as "login." Further, an operation for the PC 200 to terminate the communication connection will be referred to as "logout." In addition, an operation for the printer 100 to establish a communication connection with the cloud server 300 will be referred to as "sign-in." Furthermore, an operation for the printer 100 to terminate the communication connection will be referred to as "sign-out."

It is noted that there may be one or more image processing devices connected with the cloud server 300 other than the printer 100. However, FIG. 1 shows only the printer 100 as an example of the image processing devices connected with the cloud server 300 for the sake of simplified explanation.

[Configuration of Printer]
As shown in FIG. 1, the printer according to aspects of the present invention includes a controller 30 that includes a CPU 31, a ROM 32, a RAM 33, and a non-volatile RAM (NVRAM) 34. Further, the controller 30 is electrically connected with an image forming unit 10 configured to form an image on a sheet, an operation panel 40 configured to display an operational status and accept an input operation from a user, and an external-connection interface 37.

The ROM 32 stores control programs (firmware) for controlling the printer 100, and various settings and initial values. The RAM 33 and the NVRAM 34 are utilized as work areas for loading various control programs thereinto or storage areas for temporarily storing the print data.

The CPU 31 is configured to control elements included in the printer 100 while storing processing results into the RAM 33 or the NVRAM 34 in accordance with the control programs read out of the ROM 32 and/or signals received from various sensors.

The external-connection interface 37 is an interface for achieving communication with other devices. When the external-connection interface 37 is connected with the Internet, the printer 100 is allowed to receive the print job from the PC 200 via the cloud server 300.

Further, the external-connection interface 37 is configured to establish a direct connection (such as "WiFi-Direct) for achieving direct communication with other devices without involving any intermediate device such as a router. The printer 100 is allowed to directly receive the print job from the PC 210 via the direct connection.

The external-connection interface 37 is configured to establish only a single line connection at the same time. Therefore, when using the direct connection, the printer 100 terminates the connection with the Internet (e.g., a wired LAN and a wireless LAN, hereinafter, which will be referred to as the "Internet connection"). Meanwhile, when using the Internet connection, the printer 100 terminates the direct connection. Therefore, the printer 100 is not allowed to use both the Internet connection and the direct connection at the same time.

The image forming unit 10 may be configured to form an image on a sheet in any of image forming methods such as an electrophotographic method and an inkjet method. In addition, the image forming unit 10 may be configured to perform color printing or may be designed only for monochrome printing. Here, the image forming unit 10 is configured to perform electrographic color printing.

The operation panel 40 includes various buttons for accepting user operations, and a touch panel screen configured to display various kinds of information such as textual information and buttons. The various buttons include an OK button for providing an instruction to start a printing operation and a cancel button for providing an instruction to cancel the printing operation. The operation panel 40 is further configured to accept an input operation for signing in or signing out.

[Overview of Operations of Cloud Printing System]

Figure 2:
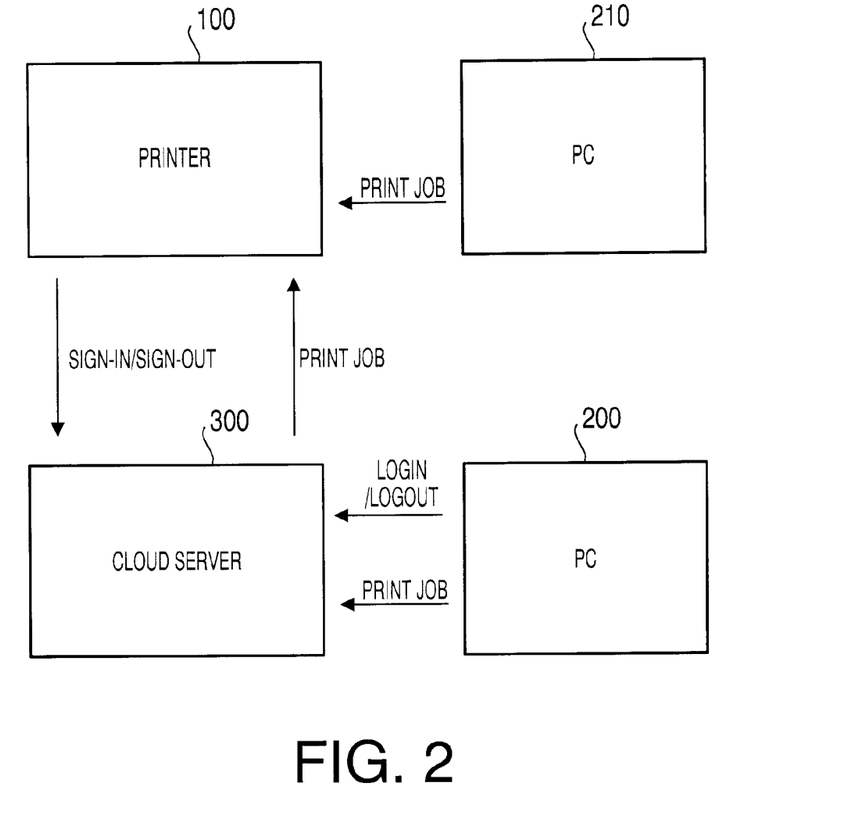
FIG. 2 is a block diagram schematically showing operations of the cloud printing system in accordance with one or more aspects of the present invention.

Subsequently, an overview of operations of the cloud printing system 900 will be described with reference to FIG. 2. In order to carry out printing with the cloud printing system 900, it is required to previously establish both a communication connection between the printer 100 and the cloud server 300 and a communication connection between the PC 200 and the cloud server 300.

Firstly, in the sign-in for establishing the communication connection between the printer 100 and the cloud server 300, the user enters an account and a password for the account in the printer 100. Then, when the cloud server 300 certificates the account, the communication connection between the printer 100 and the cloud server 300 is established.

When establishing the communication connection with the cloud server 300, that is, successfully signing in on the cloud server 300, the printer 100 begins to periodically issue a transmission request that requests the cloud server 300 to transmit to the printer 100 a print job when receiving the print job from the user who has achieved the sign-in with the certified account. The printer 100 receives the print job transmitted by the cloud server 300 in response to the transmission request, and performs printing based on the print job.

Meanwhile, in the login for establishing the communication connection between the PC 200 and the cloud server 300, the user enters an account and a password for the account in the PC 200. Then, when the cloud server 300 certificates the account, the communication connection between the PC 200 and the cloud server 300 is established.

When the communication connection is established between the PC 200 and the cloud server 300, that is, the login is successfully achieved, the print job is allowed to be transmitted to the cloud server 300 by the PC 200. The transmitted print job is once stored in the cloud server 300. Then, when the printer 100 issues the transmission request to the cloud server 300, the print job is transmitted to the printer 100, such that the printer 100 performs printing based on the print job.

When receiving the print job from the PC 210 via the direct connection, the printer 100 switches the connection destination of the external-connection interface 37 to the direct connection from the Internet connection. When the printer 100 switches the connection destination of the external-connection interface 37 to the direct connection after successfully signing in to establish the communication connection with the cloud server 300, the Internet connection is terminated. Thereby, the communication connection with the cloud printing system 900 is terminated.

[Overview of Sign-in Operation]

Figure 3:
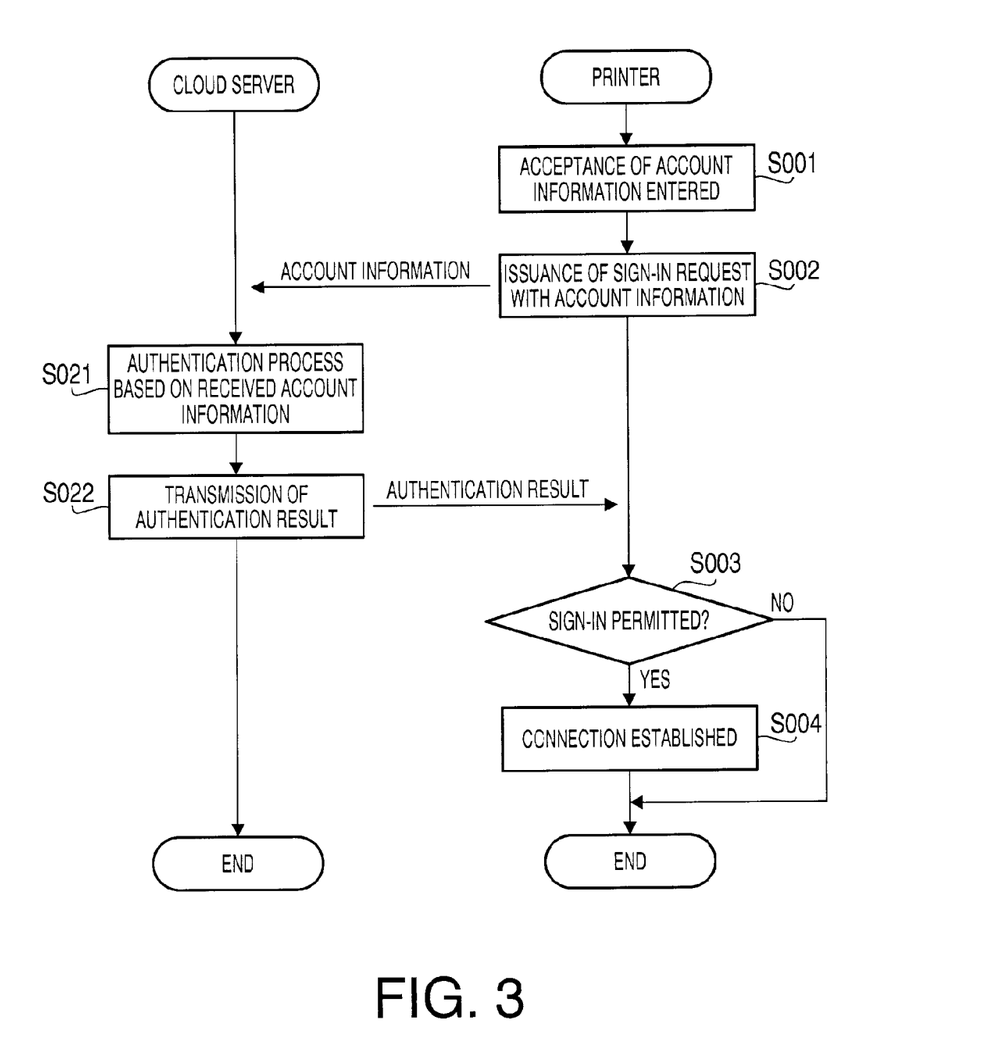
FIG. 3 is a flowchart showing a procedure of a process for the printer to sign in on the cloud printing system in accordance with one or more aspects of the present invention.

Subsequently, an explanation will be provided about an operational procedure of each device to achieve the sign-in operation of the cloud printing system 900 with reference to FIG. 3. It is noted that the following description will be provided under an assumption that the printer 100 is connected with the Internet.

When the printer 100 signs in to establish the communication connection with the cloud server 300, firstly the user operates the operation panel 40 of the printer 100 to enter account information for signing in on the cloud server 300 (S001). The account information entered in 5001 contains a name of the account and the password associated with the name of the account.

After accepting the account information entered, the printer 100 issues a sign-in request to the cloud server 300 (S002). It is noted that the account information entered in S001 is added to the sign-in request.

Upon receiving the sign-in request, the cloud server 300 performs an authentication process based on the account information (S021). Specifically, the cloud server 300 has an account database to store an account and a password associated with the account as a single record. Therefore, upon receiving the sign-in request, the cloud server 300 determines, based on the account information contained in the sign-in request, whether a record of the account entered by the user is stored in the account database and whether the password entered by the user is coincident with a password stored in the record. Then, when determining that there is stored a record of the entered account in the account database and the entered password is coincident with the password stored in the record, the cloud server 300 permits the sign-in with the account. Meanwhile, when determining that there is not stored a record of the entered account in the account database or the entered password is not coincident with the password stored in the record, the cloud server 300 does not permit the sign-in with the account. It is noted that a similar authentication process is performed in the login for establishing the communication connection between the PC 200 and the cloud server 300. After the authentication process to authenticate the entered account in S021, the cloud server 300 transmits an authentication result in the authentication process to the printer 100 (S022).

Upon receiving the authentication result from the cloud server 300, the printer 100 determines whether the sign-in is permitted, that is, whether the sign-in has successfully been completed (S003). When determining that the sign-in is permitted (S003: Yes), the printer 100 is placed into a state where the communication connection is established with the cloud server 300 (S004). After establishing the communication connection with the cloud server 300, the printer 100 begins to periodically issue the transmission request that requests the cloud server 300 to transmit a print job to the printer 100. Meanwhile, when determining that the sign-in is not permitted (S003: No), the printer 100 does not establish the communication connection with the cloud server 300.

[Connecting Process by Printer]

[First Embodiment]

Figure 4:
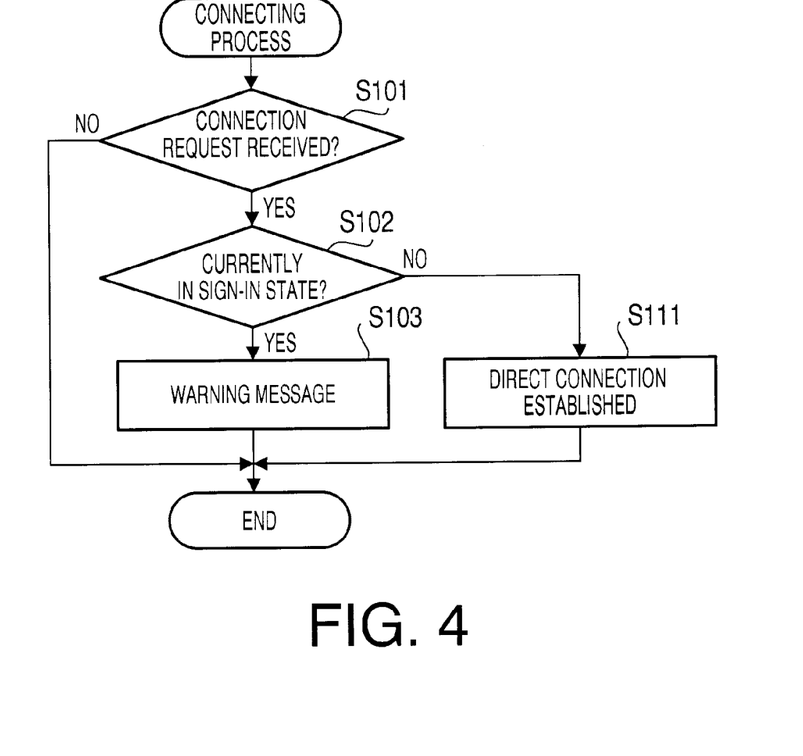
FIG. 4 is a flowchart showing a procedure of a connecting process to be executed by the printer in a first embodiment according to one or more aspects of the present invention.

Next, an explanation will be provided about a connecting process to be executed by the printer 100 upon receipt of a connection request for the direct connection, with reference to FIG. 4. The connecting process is executed by the CPU 31 in a periodic manner (e.g., every one second).

In the connecting process of a first embodiment, firstly the printer 100 determines whether the printer 100 has received a connection request for establishment of the direct connection (S101). For instance, the connection request is entered through an input operation on the operation panel 40. Alternatively, the printer 100 may receive a connection request (e.g., a below-mentioned response signal) from an external device (e.g., the PC 210).

Specifically, the following communication is previously performed to establish the direct connection between the PC 210 and the printer 100 via WiFi-Direct. Firstly, after the user determines a communication method through an operation of the operation panel 40, the printer 100 sequentially transmits search signals by sequentially using a plurality of channels. After that, the printer 100 receives a response signal to the search signal from the PC 210. The response signal contains information representing that the PC 210 is configured to perform a WiFi-Direct function and information for identifying the PC 210 (such as a device name and a MAC address). Thus, the printer 100 finds out the PC 210. At the stage where the printer 100 receives the response signal, the printer 100 and the PC 210 merely find out each other but do not establish the direct connection therebetween. When determining that the printer 100 has not received a connection request for the direct connection (S101: No), the printer 100 terminates the connecting process.

When determining that the printer 100 has received a connection request for the direct connection (S101: Yes), the printer 100 determines whether the printer 100 is in the state signing in on the cloud printing system 900, that is, whether the communication connection with the cloud server 300 is established (S102).

When the printer 100 is not in the state signing in on the cloud printing system 900 (S102: No), a user who is utilizing the cloud server 300 (e.g., a user of the PC 200) is considered not to be utilizing the printer 100. Hence, even when the direct connection is permitted and thereby printing via the cloud server 300 becomes unavailable, it is not so disadvantageous to the user utilizing the cloud server 300. Thus, the printer 100 establishes the direct connection to prioritize the user of the PC 210 (S111). Thereafter, the printer 100 terminates the connecting process.

Figure 5:
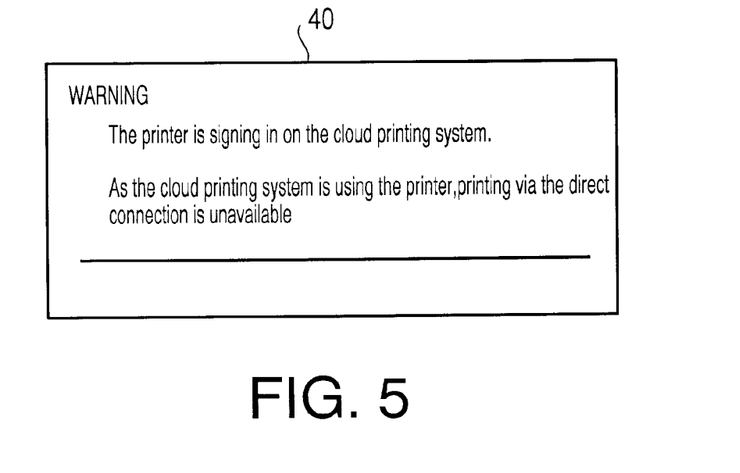
FIG. 5 exemplifies a warning message to be displayed on the printer in the first embodiment according to one or more aspects of the present invention.

Meanwhile, when the printer 100 is in the state signing in on the cloud printing system 900 (S102: Yes), the communication between the cloud server 300 and the printer 100 is periodically performed. Therefore, when the direct connection is established, the user utilizing the cloud server 300 is likely to suffer unforeseen inconveniences. Thus, in this case, the printer 100 displays on the operation panel 40 a warning message as shown in FIG. 5, which represents that the direct connection is not permitted (S103). It is noted that displaying of the warning message may be replaced with outputting of any other information such as a warning sound or an audio guidance that represents that the direct connection is not permitted. Further, when receiving the connection request directly from the PC 210, the printer 100 may transmits a warning message to the PC 210. After execution of S103, the printer 100 terminates the connecting process without establishing the direct connection.

According to the connecting process of the first embodiment, when receiving the connection request for establishment of the direct connection in the state signing in on the cloud printing system 900, the printer 100 displays the warning message representing that the direct connection is not permitted, and forbids establishment of the direct connection. Thereby, it is possible to reduce the possibility of undesired situations that the printer 100 becomes unavailable for the user who is utilizing the cloud printing system 900 despite the user's intention.

[Second Embodiment]

Figure 6:
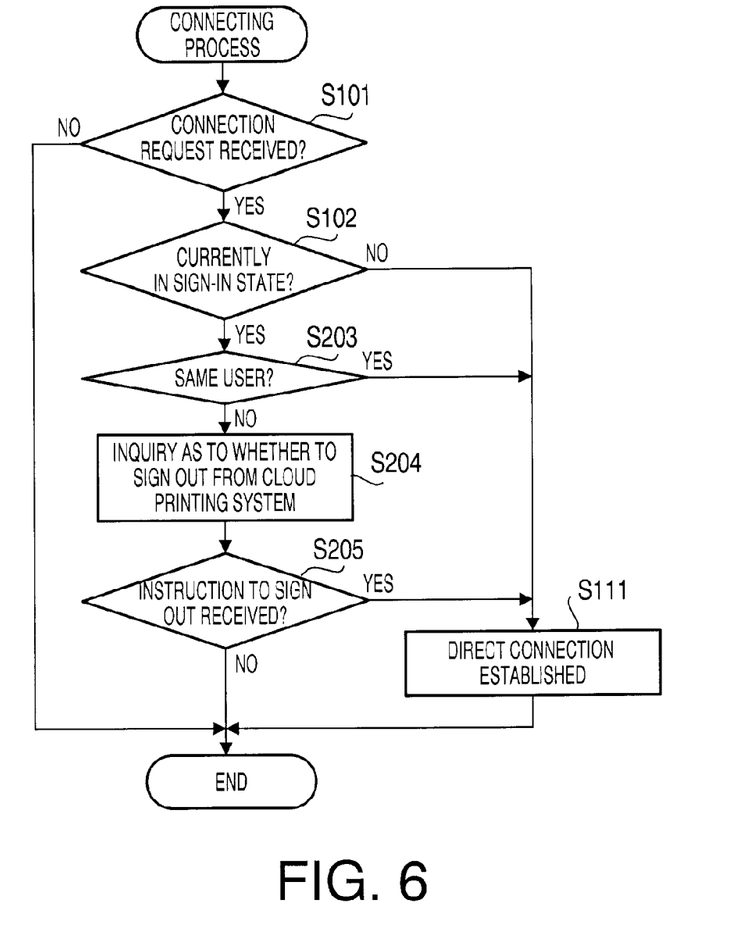
FIG. 6 is a flowchart showing a procedure of a connecting process to be executed by the printer in a second embodiment according to one or more aspects of the present invention.

Subsequently, an explanation will be provided about a connecting process of a second embodiment to be executed by the printer 100, with reference to FIG. 6. In the connecting process of the second embodiment, even in the state signing in on the cloud printing system 900, when there is a significant need for use of the direct connection, the printer 100 establishes the direct connection. In this respect, the second embodiment is different from the first embodiment where the printer 100 forbids establishment of the direct connection in the state signing in on the cloud printing system 900. It is noted that the same operational steps of the second embodiment as those of the first embodiment will be provided with the same reference characters and detailed explanations about them will be omitted.

In the connecting process of the second embodiment, firstly the printer 100 determines whether the printer 100 has received a connection request for establishment of the direct connection, in the same manner as the first embodiment (S101). When determining that the printer 100 has not received a connection request (S101: No), the printer 100 terminates the connecting process.

When determining that the printer 100 has received a connection request (S101: Yes), the printer 100 determines whether the printer 100 is in the state signing in on the cloud printing system 900 (S102). When determining that the printer 100 is not in the state signing in on the cloud printing system 900 (S102: No), the printer 100 establishes the direct connection (S111).

Meanwhile, when determining that the printer 100 is in the state signing in on the cloud printing system 900 (S102: Yes), the printer 100 determines whether the user who is signing in on the cloud printing system 900 is coincident with the user who has issued the connection request for establishment of the direct connection (S203). In this step, for example, the printer 100 may request the user who has issued the connection request to input the user's account, and may determine that the user who is signing in on the cloud printing system 900 is coincident with the user who has issued the connection request (S203: Yes) when the input account is identical to the account used for the sign-in. Alternatively, the printer 100 may acquire first information (such as a PC name and an IP address) for identifying the device that is logging in the cloud server 300 and second information (such as a PC name and an IP address) for identifying the device that has issued the connection request, and may determine that the user who is signing in on the cloud printing system 900 is coincident with the user who has issued the connection request (S203: Yes) when the device identified by the first information is identical to the device identified by the second information.

When the user who is signing in on the cloud printing system 900 is coincident with the user who has issued the connection request (S203: Yes), it is determined that the user who is signing in on the cloud printing system 900 wishes to establish the direct connection. Therefore, even though the connection with the cloud printing system 900 is terminated, there are few users who suffer unforeseen inconveniences due to the disconnection. Thus, the printer 100 establishes the direct connection (S111).

Figure 7:
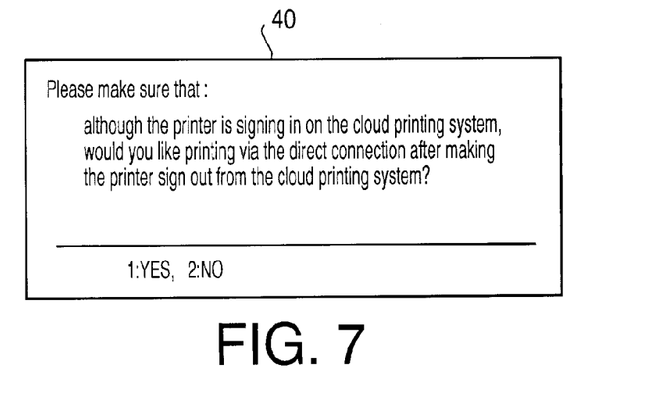
FIG. 7 exemplifies an inquiry message to be displayed on the printer in the second embodiment according to one or more aspects of the present invention.

Meanwhile, when the user who is signing in on the cloud printing system 900 is not coincident with the user who has issued the connection request (S203: Yes), the user who is utilizing the cloud server 300 suffers unforeseen inconveniences in a situation where the direct connection is established. In this case, the printer 100 displays on the operation panel 40 a screen (see FIG. 7) for asking whether the user who has issued the connection request wishes to perform printing via the direct connection (S204). In other words, the printer 100 provides the user who has issued the connection request with an opportunity for determining whether to establish the direct connection after signing out from the cloud printing system 900.

After S204, upon receiving an input from the user, the printer 100 determines whether to sign out from the cloud printing system 900 (S205). When the input from the user indicates a user's intention to sign out from the cloud printing system 900 (S205: Yes), the printer 100 establishes the direct connection in accordance with the user's intention (S111). Meanwhile, when the input from the user is not an instruction to sign out from the cloud printing system 900 (S205: No), the printer 100 terminates the connecting process without establishing the direct connection.

The printer 100 may output the same message as displayed in S103 in response to receipt of an instruction to sign out from the cloud printing system 900. Nonetheless, in the second embodiment, it is clarified in the determining step S203 that the printer 100 is signing in on the cloud printing system 900. Therefore, the connecting process of the second embodiment may be configured without a step corresponding to S103.

According to the connecting process of the second embodiment, when receiving the connection request for establishment of the direct connection in the state signing in on the cloud printing system 900, the printer 100 is allowed to call attention to the user of the PC 210 who has issued the connection request. Consequently, it is possible to avoid an undesired situation where the connection between the cloud server 300 and the printer 100 is terminated due to a careless mistake made by a user who is utilizing the cloud server 300 despite the user's intention.

[Third Embodiment]

Figure 8:
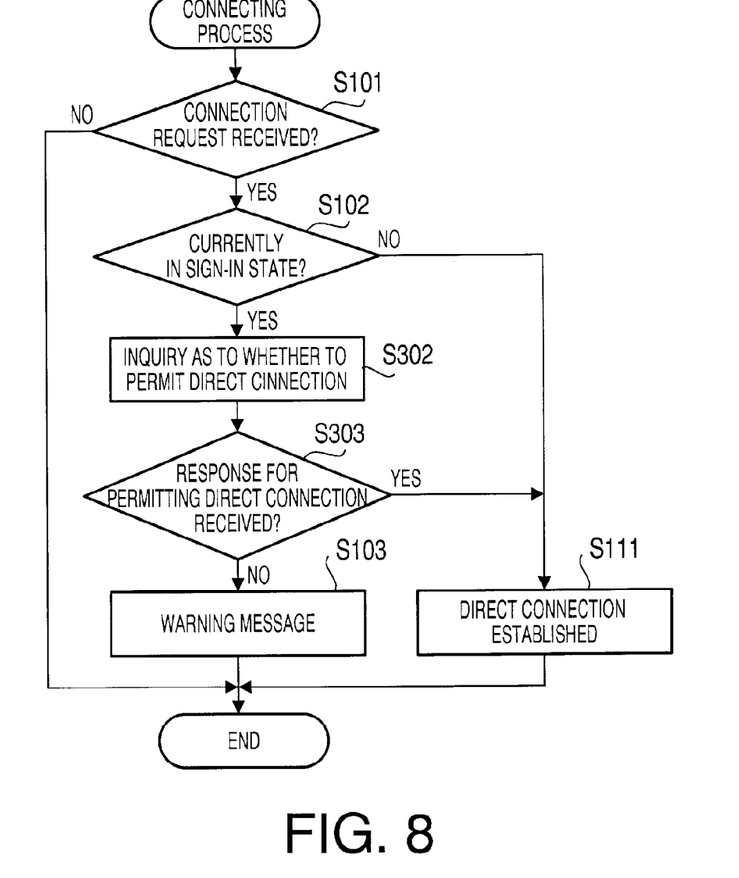
FIG. 8 is a flowchart showing a procedure of a connecting process to be executed by the printer in a third embodiment according to one or more aspects of the present invention.

Subsequently, an explanation will be provided about a connecting process of a third embodiment to be executed by the printer 100, with reference to FIG. 8. In the connecting process of the third embodiment, in the state signing in on the cloud printing system 900, the printer 100 asks the user who is utilizing the cloud server 300 whether to permit the direct connection. In this respect, the third embodiment is different from the second embodiment where the printer 100 asks the user who has issued the connection request for establishment of the direct connection whether to establish the direct connection. It is noted that the same operational steps of the third embodiment as those of the first embodiment will be provided with the same reference characters and detailed explanations about them will be omitted.

In the connecting process of the third embodiment, firstly the printer 100 determines whether the printer 100 has received a connection request for establishment of the direct connection, in the same manner as the first embodiment (S101). When determining that the printer 100 has not received a connection request (S101: No), the printer 100 terminates the connecting process.

When determining that the printer 100 has received a connection request (S101: Yes), the printer 100 determines whether the printer 100 is in the state signing in on the cloud printing system 900 (S102). When determining that the printer 100 is not in the state signing in on the cloud printing system 900 (S102: No), the printer 100 establishes the direct connection (S111).

Figure 9:
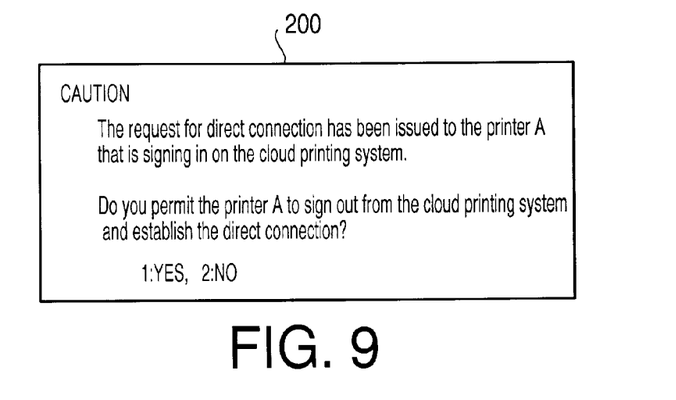
FIG. 9 exemplifies an inquiry message to be displayed on the printer in the third embodiment according to one or more aspects of the present invention.

Meanwhile, when determining that the printer 100 is in the state signing in on the cloud printing system 900 (S102: Yes), the printer 100 informs the user who is logging in the cloud server 300 (that is, here, the user of the PC 200) that the printer 100 has received the connection request for the direct connection and asks the user of the PC 200 whether to permit the direct connection (S302). In S302, for example, the printer 100 creates and sends an e-mail for asking whether to permit the direct connection to a mail address of the user of the PC 200 that is previously stored in the printer 100. The PC 200 receives the e-mail and displays the received e-mail on a display thereof as shown in FIG. 9. Then, the printer 100 awaits a response from the user of the PC 200.

After that, the printer 100 determines whether the printer 100 has received a response for permitting the direct connection from the user of the PC 200 (S303). When the printer 100 has received a response for permitting the direct connection from the user of the PC 200 (S303: Yes), even though the connection between the printer 100 and the cloud server 300 is terminated, the user of the PC 200 does not suffer any unforeseen inconveniences. Thus, the printer 100 establishes the direct connection (S111).

Meanwhile, when determining that the printer 100 has received a response for not permitting the direct connection from the user of the PC 200 (S303: No), the printer 100 displays a warning message representing that the direct connection is not permitted (S103). When there is no response from the user of the PC 200 even after the lapse of a predetermined time period after the inquiry in S302, the printer 100 may determine not to permit the direct connection. After execution of S103, the printer 100 terminates the connecting process without establishing the direct connection.

According to the connecting process of the third embodiment, when the printer 100 receives the connection request for the direct connection in the state signing in on the cloud printing system 900, the user who is utilizing the cloud server 300 is notified of it. Further, since the user utilizing the cloud server 300 is allowed to issue an instruction to permit the direct connection or an instruction not to permit the direct connection, it is possible to avoid an undesired situation where the connection between the cloud server 300 and the printer 100 is terminated despite the intention of the user utilizing the cloud server 300.

[Fourth Embodiment]

Figure 10:
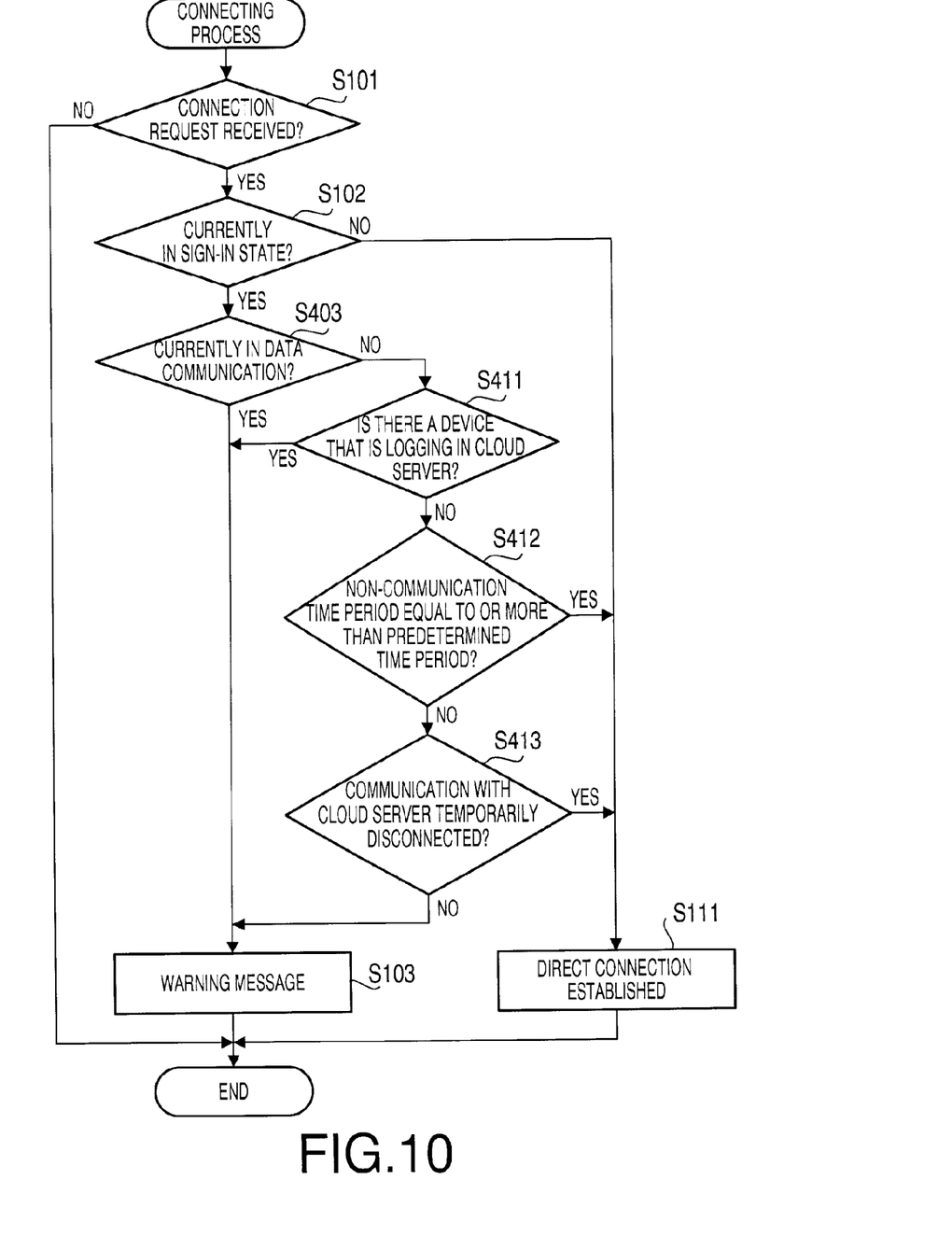
FIG. 10 is a flowchart showing a procedure of a connecting process to be executed by the printer in a fourth embodiment according to one or more aspects of the present invention.

Subsequently, an explanation will be provided about a connecting process of a fourth embodiment to be executed by the printer 100, with reference to FIG. 10. In the connecting process of the fourth embodiment, in the state signing in on the cloud printing system 900, the printer 100 determines whether the cloud server 300 is actually utilized, and establishes the direct connection when determining that the cloud server 300 is not utilized. In this respect, the fourth embodiment is different from the second and third embodiments that require the user's determination as to whether to permit the direct connection, that is, user's efforts. It is noted that the same operational steps of the fourth embodiment as those of the first embodiment will be provided with the same reference characters and detailed explanations about them will be omitted.

In the connecting process of the fourth embodiment, firstly the printer 100 determines whether the printer 100 has received a connection request for the direct connection, in the same manner as the first embodiment (S101). When determining that the printer 100 has not received a connection request (S101: No), the printer 100 terminates the connecting process.

When determining that the printer 100 has received a connection request (S101: Yes), the printer 100 determines whether the printer 100 is in the state signing in on the cloud printing system 900 (S102). When determining that the printer 100 is not in the state signing in on the cloud printing system 900 (S102: No), the printer 100 establishes the direct connection (S111).

Meanwhile, when determining that the printer 100 is in the state signing in on the cloud printing system 900 (S102: Yes), the printer 100 determines whether the printer 100 is communicating with the cloud server 300 (S403). In S403, for example, the printer 100 may determine that the printer 100 is communicating with the cloud server 300 when an amount of communication per unit time period is more than zero, and may determine that the printer 100 is not communicating with the cloud server 300 when the amount of communication per unit time period is equal to zero. In the case where the printer 100 is communicating with the cloud server 300 (S403: Yes), when the connection between the cloud server 300 and the printer 100 is terminated, the user utilizing the cloud server 300 suffers unforeseen inconveniences due to the disconnection. Therefore, the printer 100 displays a warning message representing that the direct connection is not permitted (S103). Thereafter, the printer 100 terminates the connecting process without establishing the direct connection.

When the printer 100 is not communicating with the cloud server 300 (S403: No), the printer 100 asks the cloud server 300 whether there is a device that is logging in the cloud server 300 and determines whether there is a device that is logging in the cloud server 300 (S411). In the case where there is a device that is logging in the cloud server 300 (S411: Yes), when the connection between the cloud server 300 and the printer 100 is terminated, the user who is utilizing the cloud server 300 is more likely to suffer unforeseen inconveniences. Therefore, the printer 100 displays a warning message representing that the direct connection is not permitted (S103). Thereafter, the printer 100 terminates the connecting process without establishing the direct connection.

When determining that there is not a device that is logging in the cloud server 300 (S411: No), the printer 100 determines whether a non-communication time period during which no communication has been performed between the printer 100 and the cloud server 300 is equal to or more than a predetermined time period (S412). The predetermined time period is set by a user or previously set as a default value at a factory. When the non-communication time period is equal to or more than the predetermined time period (S412: Yes), it is presumed that the user who is logging in the cloud server 300 is less willing to perform printing. Thus, the printer 100 permits the direct connection to prioritize the user of the PC 210 (S111). Thereafter, the printer 100 terminates the connecting process.

When determining that the non-communication time period is not equal to or more than the predetermined time period (S412: No), the printer 100 determines whether the communication between the printer 100 and the cloud server 300 is temporarily disconnected (S413). The situation where the communication between the printer 100 and the cloud server 300 is temporarily disconnected corresponds to, for example, a state where the server 300 is temporarily unavailable for reasons such as a high load applied to the server 300 and maintenance on the server 300. The printer 100 is allowed to acquire the state of the cloud server 300 when receiving from the cloud server 300 a response to the periodic transmission request for transmission of the print job. When the communication between the printer 100 and the cloud server 300 is temporarily disconnected (S413: Yes), the printer 100 is not allowed to receive the print data. Therefore, even though the connection with the cloud printing system 900 is terminated, the user of the cloud server 300 is less likely to suffer inconveniences. Thus, the printer 100 establishes the direct connection to prioritize the user of the PC 210 (S111). Thereafter, the printer 100 terminates the connecting process.

When the communication between the printer 100 and the cloud server 300 is not disconnected (S413: No), the print job is likely to be transmitted to the printer 100 by the PC 200. Therefore, the printer 100 displays a warning message representing that the direct connection is not permitted (S103). Thereafter, the printer 100 terminates the connecting process without establishing the direct connection.

According to the connecting process of the fourth embodiment, even in the state signing in on the cloud printing system 900, the printer 100 establishes the direct connection when the cloud server 300 is not utilized. Thus, it is possible to improve convenience and user-friendliness in using the cloud printing system 900.

It is noted that in the fourth embodiment, determinations of S403, S411, S412, and S413 do not necessarily have to be all performed. One or more determinations of S403, S411, S412, and S413 may be selected as needed depending on required specifications of the printer 100.

As described in detail above, according to the connecting processes of the first to fourth embodiments, when the connection with the cloud server 300 is established, the printer 100 does not permit the direct connection with the PC 210 that leads to termination of the connection with the cloud server 300. Thus, it is possible to avoid an undesired situation where the connection between the cloud server 300 and the printer 100 is terminated and the printer 100 becomes unavailable despite the intention of the user of the PC 200.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The printer 100 exemplified in the aforementioned embodiments may be replaced with any other devices having an image processing functions such as an image scanner, a facsimile machine, a copy machine, and a multi-function peripheral. In addition, the PC 200 and the PC 210 that are configured to transmit the print job to the printer 100 may be replaced with mobile devices such as smartphones.

In the aforementioned embodiments, to establish the connection between the printer 100 and the cloud server 300, the cloud printing system 900 requests a password and performs the authentication process. However, the authentication process does not necessarily have to be performed.

In the aforementioned embodiments, after successfully signing in on the cloud server 300, the printer 100 periodically issues the transmission request to the cloud server 300. Then, in response to receipt of the transmission request, the cloud server 300 transmits the print job, which has been transmitted thereto, to the printer 100. However, for example, the cloud server 300 may store the sign-in of the printer 100. Then, upon receipt of the print job that designates the printer 100 as a transmission destination, the cloud server 100 may transmit to the printer 100 the received print job or an acquisition request that requests the printer 100 to acquire the print job.

Further, another modification may be configured with a combination of two or more aspects of the first to fourth embodiments. For example, by combining the second embodiment and the third embodiment, the cloud printing system 900 may be configured to ask both the user who has issued the connection request for the direct connection and the user who is logging in the cloud server 300 whether to establish the direct connection. In this case, for example, the cloud printing system 900 may be configured to first ask one of the user who has issued the connection request for the direct connection and the user who is logging in the cloud server 300 and then ask the other user whether to establish the direct connection when having received no reply from the one user within a predetermined time period. Further, by combining the fourth embodiment and at least one of the second and third embodiments, the cloud printing system 900 may be configured to allow the printer 100 and at least one of the user who has issued the connection request for the direct connection and the user who is logging in the cloud server 300 to determine whether to establish the direct connection. In this case, for example, the cloud printing system 900 may be configured to first provide the at least one of the users with an opportunity for determining whether to establish the direct connection and then cause the printer 100 to determine whether to establish the direct connection when having received no reply from the at least one of the users within a predetermined time period.

Further, for example, the cloud printing system 900 may be configured to make one of the determination in S203 and the determination in S204 to S205 in the second embodiment. Further, in the fourth embodiment, when determining that the printer 100 is not communicating with the cloud server 300 (S403: No), the printer 100 may go to S111 without executing any of S411 to S413.

What is claimed is:

1. An image processing device comprising:
   an image processing unit for processing an image data;
   a network interface configured to communicate with a server device via a network and configured to communicate with a client device without involving the network;
   an acceptor configured to accept first account information for a user;
   a controller configured to:
      in response to accepting the account information by the acceptor, establish a first connection between the image processing device and the server device via the network by sending the first account information accepted by the acceptor to the server device;
      in response to receiving a connection request from the client device through the network interface without involving the network while the image processing device is in a signed-in state in which the image processing device maintains the first connection between the image processing device and the server device:
         determine whether or not second account information that the image processing device receives from the client device is the same as the first account information that the image processing device has sent to the server device for signing-in on the server device,
         when it is determined that the second account information that the image processing device receives from the client device is the same as the first account information that the image processing device has sent to the server device for signing-in on the server device, disconnect the first connection with the server device and establish a second connection between the image processing device and the client device without involving the network, and
         when it is determined that the second account information that the image processing device receives from the client device is different from the first account information that the image processing device has sent to the server device for signing-in on the server device, maintain the first connection between the image processing device and the server device; and
      in response to receiving the connection request from the client device while the image processing device is not in a signed-in state, establish the second connection between the image processing device and the client device.

2. The image processing device according to claim 1, wherein the controller is further configured to:
   make an inquiry to the user as to whether to prioritize the second connection with the client device when the connection request is received in the state where the first connection is established between the image processing device and the server device,
   restrict establishment of the second connection when a response to the inquiry is received from the client device indicating that the user does not prioritize the second connection, and
   permit establishment of the second connection when a response to the inquiry is received from the client device indicating that the user prioritizes the second connection.

3. The image processing device according to claim 1, wherein the controller is further configured to:
   make an inquiry to the server device as to whether to permit establishment of the second connection with the client device when the connection request is received in the state where the first connection is established between the image processing device and the server device,
   restrict establishment of the second connection when the a response to the inquiry is received from the server device indicating that the server device does not permit establishment of the second connection, and
   permit establishment of the second connection when the a response to the inquiry is received from the server device indicating that the server device permits establishment of the second connection.

4. The image processing device according to claim 1, where in the controller is further configured to:
   determine whether a non-communication time period during which no communication has been performed between the image processing device and the server device is equal to or more than a predetermined time period in the state where the first connection is established between the image processing device and the server device, and
   permit establishment of the second connection with the client device when it is determined that the non-communication time period is equal to or more than the predetermined time period.

5. The image processing device according to claim 1, wherein the controller is further configured to permit establishment of the second connection with the client device when communication between the image processing device and the server device is temporarily disconnected even in the state where the first connection is established between the image processing device and the server device.

6. The image processing device according to claim 1, further comprising a notification unit configured to provide a notification that the second connection with the client device is not permitted when the controller restricts establishment of the second connection.

7. An image processing system comprising:
   an image processing device;
   a server device configured to communicate with the image processing device; and a client device configured to communicate with the image processing device, the image processing device comprising:
- an image processing unit for processing an image data;
- a network interface configured to communicate with the server device via a network and configured to communicate with the client device without involving the network;
- an acceptor configured to accept first account information for a user;
- a controller configured to:
  - in response to accepting the first account information by the acceptor, establish a first connection between the image processing device and the server device via the network by sending the first account information accepted by the acceptor to the server device;
  - in response to receiving a connection request from the client device through the network interface without involving the network while the image processing device is in a signed-in state in which the image processing device maintains the first connection between the image processing device and the server device,
    - determine whether or not second account information that the image processing device receives from the client device is the same as the first account information that the image processing device has sent to the server device for signing-in on the server device,
    - when it is determined that the second account information that the image processing device receives from the client device is the same as the first account information that the image processing device has sent to the server device for signing-in on the server device, disconnect the first connection with the server device and establish a second connection between the image processing device and the client device without involving the network, and
    - when it is determined that the second account information that the image processing device receives from the client device is different from the first account information that the image processing device has sent to the server device for signing-in on the server device, maintain the first connection between the image processing device and the server device; and
  - in response to receiving the connection request from the client device while the image processing device is not in a signed-in state, establish the second connection between the image processing device and the client device.

8. The image processing system according to claim 7, wherein the controller is further configured to:
- transmit data to the image processing device via the server device,
- restrict establishment of the second connection with the client device when an access-permitted state is maintained where the third information processing device is permitted to access the server device, and
- permit establishment of the second connection with the client device when the access-permitted state is not maintained.

9. The image processing system according to claim 7, wherein the controller is further configured to:
- make an inquiry to the user as to whether to prioritize the second connection with the client device when the connection request is received in the state where the first connection is established between the image processing device and the server device, and
- restrict establishment of the second connection when a response to the inquiry is received from the client device indicating that the user does not prioritize the second connection, and
- permit establishment of the second connection when is received from the client device indicating that the user prioritizes the second connection.

10. The image processing system according to claim 7, wherein the controller is further configured to:
- make an inquiry to the server device as to whether to permit establishment of the second connection with the client device when the connection request is received in the state where the first connection is established between the image processing device and the server device, and
- restrict establishment of the second connection when a response to the inquiry is received from the server device indicating that the server device does not permit establishment of the second connection, and
- permit establishment of the second connection when a response to the inquiry is received from the server device indicating that the server device permits establishment of the second connection.

11. The image processing system according to claim 7, wherein the controller is further configured to:
- determine whether a non-communication time period during which no communication has been performed between the image processing device and the server device is equal to or more than a predetermined time period in the state where the first connection is established between the image processing device and the server device, and
- permit establishment of the second connection with the client device when the determining unit determines that the non-communication time period is equal to or more than the predetermined time period.

12. The image processing system according to claim 7, wherein the controller is further configured to permit establishment of the second connection with the client device when communication between the image processing device and the server device is temporarily disconnected even in the state where the first connection is established between the image processing device and the server device.

13. The image processing system according to claim 7, wherein the image processing device further comprises a notification unit configured to provide a notification that the second connection with the client device is not permitted when the controller restricts establishment of the second connection.

14. An image processing device comprising:
- an image processing unit configured to perform image processing for an image;
- a communication unit configured to communicate with a server device via a network, the communication unit being configured to communicate with a client device without involving the network;
- an instruction receiving unit configured to receive connection requests; and
- a controller configured to:
  - in response to receiving a first connection request via the network, which includes first user information that identifies a first user, through the instruction receiving unit, establish a first connection via the network by sending the first user information to the server device through the communication unit;

in response to receiving a second connection request without involving the network, which includes second user information that identifies a second user, while the controller is maintaining the first connection through the communication unit:
- determine whether the first user identified by first user information that the controller has sent to the server device through the communication unit for establishing the first connection is the same as the second user information included in the second connection request that the controller receives through the communication unit;
- control the communication unit to maintain the first connection between the image processing device and the server device when determining that the first user identified by the first user information that is included in the first connection request that the controller has sent to the server device for establishing the first connection between the image processing device and the server device is different from the second user identified by the second user information that is included in the second connection request that the controller receives from the client device through the communication unit; and
- control the communication unit to disconnect the first connection between the image processing device and the server device and establish a second connection between the client device and the image processing device without involving the network when determining that the first user identified by the first user information that is included in the first connection request that the controller has sent to the server device for establishing the first connection between the image processing device and the server device is the same as the second user identified by the second user information that is included in the second connection request that the controller receives through the communication unit.

15. The image processing device according to claim 14, wherein the controller is further configured to, in response to the instruction receiving unit receiving the second connection request:
- determine whether an elapsed time that has elapsed since last communication between the communication unit and the server device is equal to or more than a predetermined time period;
- control the communication unit to maintain the first connection between the image processing device and the server device when determining that the elapsed time that has elapsed since the last communication between the communication unit and the server unit is not equal to or more than the predetermined time period; and
- control the communication unit to disconnect the first connection between the image processing device and the server device and establish the second connection between the client device and the image processing device when determining that the elapsed time that has elapsed since the last communication between the communication unit and the server unit is equal to or more than the predetermined time period.

* * * * *